(12) United States Patent
Zientek et al.

(10) Patent No.: US 9,487,291 B2
(45) Date of Patent: Nov. 8, 2016

(54) APPARATUS, SYSTEM, AND METHOD FOR PITCHING AND TWISTING A BLADE OF A ROTORCRAFT

(71) Applicant: The Boeing Company, Chicago, IL (US)

(72) Inventors: Thomas A. Zientek, Media, PA (US); Terrence S. Birchette, Chandler, AZ (US); Friedrich K. Straub, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 1008 days.

(21) Appl. No.: 13/705,780

(22) Filed: Dec. 5, 2012

(65) Prior Publication Data

US 2014/0154074 A1 Jun. 5, 2014

(51) Int. Cl.
| | |
|---|---|
| *B64C 27/605* | (2006.01) |
| *B64C 27/46* | (2006.01) |
| *B64C 27/72* | (2006.01) |

(52) U.S. Cl.
CPC .......... *B64C 27/605* (2013.01); *B64C 27/463* (2013.01); *B64C 2027/7222* (2013.01); *B64C 2027/7244* (2013.01); *Y02T 50/34* (2013.01)

(58) Field of Classification Search
CPC ... B64C 27/327; B64C 27/46; B64C 27/463; B64C 27/48; B64C 27/7294; B64C 27/54; B64C 27/59; B64C 27/605; B64C 27/615; B64C 27/625
USPC ................................................ 416/147, 148
See application file for complete search history.

(56) References Cited

U.S. PATENT DOCUMENTS

| | | | |
|---|---|---|---|
| 2,584,663 A * | 2/1952 | Bensen | B64C 27/46 416/147 |
| 3,460,628 A | 8/1969 | Tankersley | |
| 5,284,419 A * | 2/1994 | Lutz | B64C 27/46 416/132 R |
| 6,024,325 A * | 2/2000 | Carter, Jr. | B64C 27/46 244/17.25 |
| 6,065,934 A | 5/2000 | Jacot et al. | |
| 6,135,713 A | 10/2000 | Domzalski et al. | |
| 6,307,301 B1 | 10/2001 | Ngo et al. | |
| 6,471,477 B2 | 10/2002 | Hassan et al. | |
| 6,499,952 B1 | 12/2002 | Jacot et al. | |
| 6,543,719 B1 | 4/2003 | Hassan et al. | |
| 6,671,590 B1 * | 12/2003 | Betzina | B64C 27/001 415/119 |
| 7,798,443 B2 | 9/2010 | Hamilton et al. | |
| 7,980,516 B2 | 7/2011 | Birchette | |
| 2008/0131280 A1 * | 6/2008 | Krauss | B64C 27/10 416/131 |
| 2012/0153073 A1 * | 6/2012 | Groen | B64C 27/473 244/17.13 |

FOREIGN PATENT DOCUMENTS

GB 2464678 A * 4/2010 ........... B64C 27/473

OTHER PUBLICATIONS

Extended European Search Report, dated Apr. 8, 2014, regarding Application No. EP13195881.1, 6 pages.

* cited by examiner

*Primary Examiner* — Eric Keasel
*Assistant Examiner* — Joshua R Beebe
(74) *Attorney, Agent, or Firm* — Yee & Associates, P.C.

(57) ABSTRACT

A method and apparatus for moving a blade of a rotorcraft. The method comprises operating the rotorcraft and applying a torque to an elongate member connected to a tip portion of the blade during operation of the rotorcraft using a tip actuation mechanism that is external to the blade and associated with the elongate member such that the tip portion of the blade rotates about an axis through the blade.

20 Claims, 8 Drawing Sheets

APPARATUS, SYSTEM, AND METHOD FOR PITCHING AND TWISTING A BLADE OF A ROTORCRAFT

BACKGROUND INFORMATION

1. Field

The present disclosure relates generally to the blades of a rotorcraft and, in particular, to a system for moving the blade of a rotorcraft. Still more particularly, the present disclosure relates to an apparatus, system, and method for pitching and twisting the blade of a rotorcraft using an actuation system that is external to the blade and located at a root portion of the blade.

2. Background

A rotorcraft is a type of aircraft that operates using the lift generated by blades revolving around a mast. A helicopter is an example of a rotorcraft. The blades of a rotorcraft may be part of a rotor system. In some cases, these blades are referred to as rotor blades. The blades of a rotorcraft may be pitched and/or twisted during operation to generate the lift needed to allow the rotorcraft to hover and/or fly.

Pitching a blade means rotating the blade about an axis through the length of the blade. Pitching may be used to control the direction in which the maximum amount of thrust is generated by the rotorcraft. Twisting a blade means twisting the blade about an axis extending from one end of the blade to another end of the blade. Typically, a blade is twisted with respect to the axis about which the blade rotates or pitches. Changing the amount of twisting of the blades of a rotorcraft in different flight regimes may improve the efficiency of the rotorcraft. The different flight regimes for a rotorcraft may include hover, climb, descent, and forward flight. Further, the rotorcraft may perform maneuvers that may include some combination of the above regimes.

Some currently available systems for twisting a blade use piezoelectric actuators mounted to the blade. However, these types of actuators may require a higher voltage to be supplied to the actuators than desired. Further, supplying voltage to these actuators may require that power lines be run along the length of the blade to reach the actuators mounted on the blade.

Other currently available systems for twisting a blade use shape memory alloys. However, shape memory alloys may have slower actuation times than desired. Consequently, changing the degree of twisting of a blade may take longer than desired.

Further, some currently available systems for twisting a blade may use actuators that are heavier than desired and/or that change the overall contour of the blade when mounted to the blade more than desired. This increased weight and/or change in contour may reduce the performance of the blade during operation of the rotorcraft more than desired. Therefore, it would be desirable to have an apparatus, system, and method that take into account at least some of the issues discussed above, as well as other possible issues.

SUMMARY

In one illustrative embodiment, an apparatus comprises a blade of a rotorcraft and a tip actuation mechanism that is external to the blade and associated with an elongate member that is connected to a tip portion of the blade. The tip actuation mechanism is configured to apply a torque to the elongate member such that the tip portion of the blade rotates about an axis through the blade.

In another illustrative embodiment, a rotor system comprises a plurality of blades and a pitch and twist system comprising a plurality of actuation systems. Each of the plurality of actuation systems is associated with a corresponding one of the plurality of blades and comprises a root actuation and a tip actuation mechanism that are external to a blade. The root actuation mechanism is associated with a root portion of the blade and is configured to apply a first torque to the root portion of the blade such that the root portion of the blade rotates about an axis. The tip actuation mechanism is associated with an elongate member that is connected to a tip portion of the blade. The tip actuation mechanism is configured to apply a second torque to the elongate member such that the tip portion of the blade rotates about the axis.

In still yet another illustrative embodiment, a method for moving a blade of a rotorcraft is provided. The method comprises operating the rotorcraft and applying a torque to an elongate member connected to a tip portion of the blade during operation of the rotorcraft using a tip actuation mechanism that is external to the blade and associated with the elongate member such that the tip portion of the blade rotates about an axis through the blade.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments provide a pitch and twist system that may be used to control the pitching and twisting of the rotor blades of a rotorcraft. The pitch and twist system includes actuation systems, each of which may be configured to control the motion of a corresponding rotor blade of the rotorcraft. The pitch and twist system provided by the different illustrative embodiments takes into account various considerations.

For example, an actuation system in this pitch and twist system may be used to pitch a rotor blade at higher pitch frequencies than is allowed with some currently available actuation systems. A rotor blade may be configured to pitch within a selected range. The "pitch frequency" of the rotor blade may be the number of cycles through this selected range that the rotor blade completes per revolution of the rotor blade about the mast of the rotor system.

Further, the actuation system may be used to change the amount of twisting of the rotor blade during any one of or any combination of flight regimes for the rotorcraft. The illustrative embodiments recognize and take into account that some currently available actuation systems may be unable to change the amount of twisting of a rotor blade during flight regimes such as, for example, without limitation, forward flight.

However, the actuation system provided by the illustrative embodiments allows changes to the twisting of the rotor blade during flight such that the performance of the rotorcraft may be improved during flight. For example, vibrations and/or noise generated during flight of the rotorcraft may be reduced by changing the amount of twisting of the rotor blades of the rotorcraft during flight.

Figure 1:
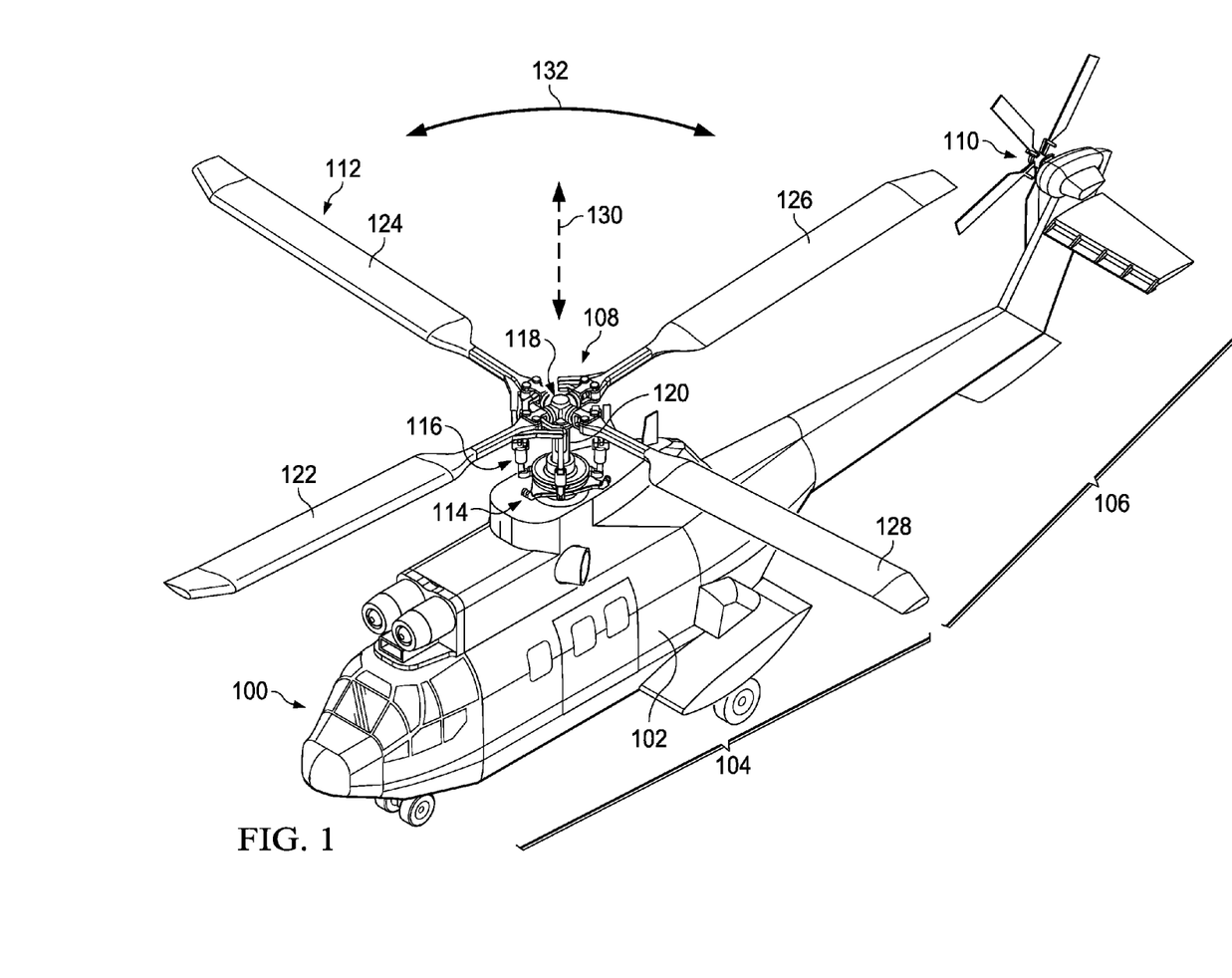
FIG. 1 is an illustration of an isometric view of a rotorcraft in accordance with an illustrative embodiment.

Referring now to the figures and, in particular, with reference to FIG. 1, an illustration of an isometric view of a rotorcraft is depicted in accordance with an illustrative embodiment. Rotorcraft 100 may be an example of a vehicle in which the different illustrative embodiments may be implemented. Rotorcraft 100 is a helicopter in this illustrative example. As depicted, rotorcraft 100 has body 102 with main section 104 and tail section 106. Further, rotorcraft 100 includes main rotor system 108 and tail rotor system 110.

In this illustrative example, main rotor system 108 includes plurality of blades 112, swashplate assembly 114, pitch and twist system 116, hub 118, and mast 120. Plurality of blades 112 includes blades 122, 124, 126, and 128. These blades may also be referred to as rotor blades in some cases. As depicted, blades 122, 124, 126, and 128 are attached to hub 118. Hub 118, in turn, is attached to mast 120.

Mast 120 may extend from a transmission system (not shown in this view) in rotorcraft 100. This transmission system is configured to rotate mast 120 about center axis 130 through mast 120 in one of the directions along arrow 132 during operation of rotorcraft 100. Rotation of mast 120, in turn, causes rotation of hub 118 and thereby, plurality of blades 112, about center axis 130.

One or more of plurality of blades 112 may be pitched during rotation of plurality of blades 112 about center axis 130. As used herein, "pitching" a blade means rotating an entirety of the blade about an axis through the length of the blade by a same amount and in a same direction. The pitching of plurality of blades 112 may occur cyclically during operation of rotorcraft 100. In this illustrative example, pitching may be used to control the direction in which the maximum amount of thrust is generated by rotorcraft 100.

Further, one or more of plurality of blades 112 may be twisted during operation of rotorcraft 100. As used herein, "twisting" a blade may mean twisting the blade about an axis extending from one end of the blade to another end of the blade. In other words, one portion of the blade may be rotated about this axis differently from at least one other portion of the blade. Twisting may be used to control the lift generated by rotorcraft 100 during flight. In particular, increasing the amount of twisting of each of plurality of blades 112 may increase the lift generated by rotorcraft 100.

In this illustrative example, swashplate assembly 114 and pitch and twist system 116 may be used to control the movement of plurality of blades 112. Pitch and twist system 116 is associated with plurality of blades 112 and swashplate assembly 114 in this illustrative example.

As used herein, when one component is "associated" with another component, the association is a physical association in the depicted examples. For example, a first component, such as pitch and twist system 116, may be considered to be associated with a second component, such as a blade in plurality of blades 112, by being secured to the second component, bonded to the second component, mounted to the second component, welded to the second component, fastened to the second component, and/or connected to the second component in some other suitable manner.

Further, the first component also may be connected to the second component using a third component. The first component may also be considered to be associated with the second component by being formed as part of and/or an extension of the second component.

Figure 2:
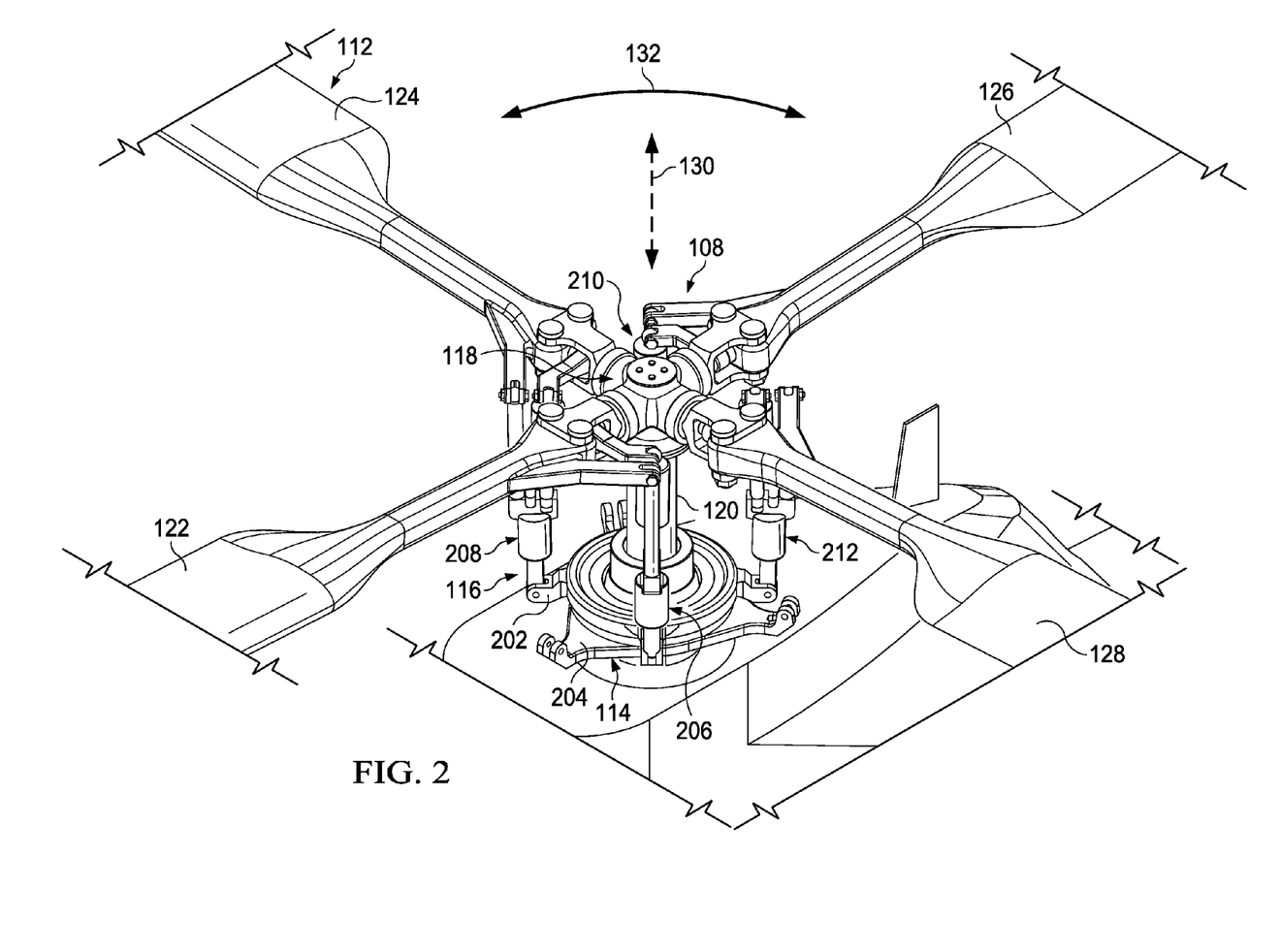
FIG. 2 is an illustration of an enlarged isometric view of a portion of main rotor system in accordance with an illustrative embodiment.

With reference now to FIG. 2, an illustration of an enlarged isometric view of a portion of main rotor system 108 from FIG. 1 is depicted in accordance with an illustrative embodiment. In FIG. 2, an enlarged view of a portion of main rotor system 108 from FIG. 1 is depicted such that swashplate assembly 114 and pitch and twist system 116 may be more clearly seen.

As depicted, swashplate assembly 114 includes first swashplate 202 and second swashplate 204. In this illustrative example, first swashplate 202 is configured to rotate about center axis 130 as mast 120 rotates about center axis 130. However, second swashplate 204 may not be configured to rotate about center axis 130 in this illustrative example.

Pitch and twist system 116 is associated with first swashplate 202. As depicted, pitch and twist system 116 includes actuation systems 206, 208, 210, and 212. These actuation systems are associated with first swashplate 202 in this illustrative example. Further, these actuation systems are movably connected to first swashplate 202.

As used herein, when a first component, such as actuation system 206, is "movably connected" to a second component, such as first swashplate 202, each of the first component and the second component may be moved relative to the other. In this manner, each of actuation systems 206, 208, 210, and 212 may be connected to first swashplate 202 in a manner that allows the actuation system to be moved relative to first swashplate 202.

Actuation systems 206, 208, 210, and 212 are also associated with blades 122, 124, 126, and 128 respectively. Each of actuation systems 206, 208, 210, and 212 is externally located with respect to the corresponding blade. In this manner, these actuations systems do not change the shape or contour of the corresponding blades and do not add additional weight to the corresponding blades. Each of actuation systems 206, 208, 210, and 212 may be used to pitch and/or twist the corresponding blade with which the actuation system is associated.

Figure 3:
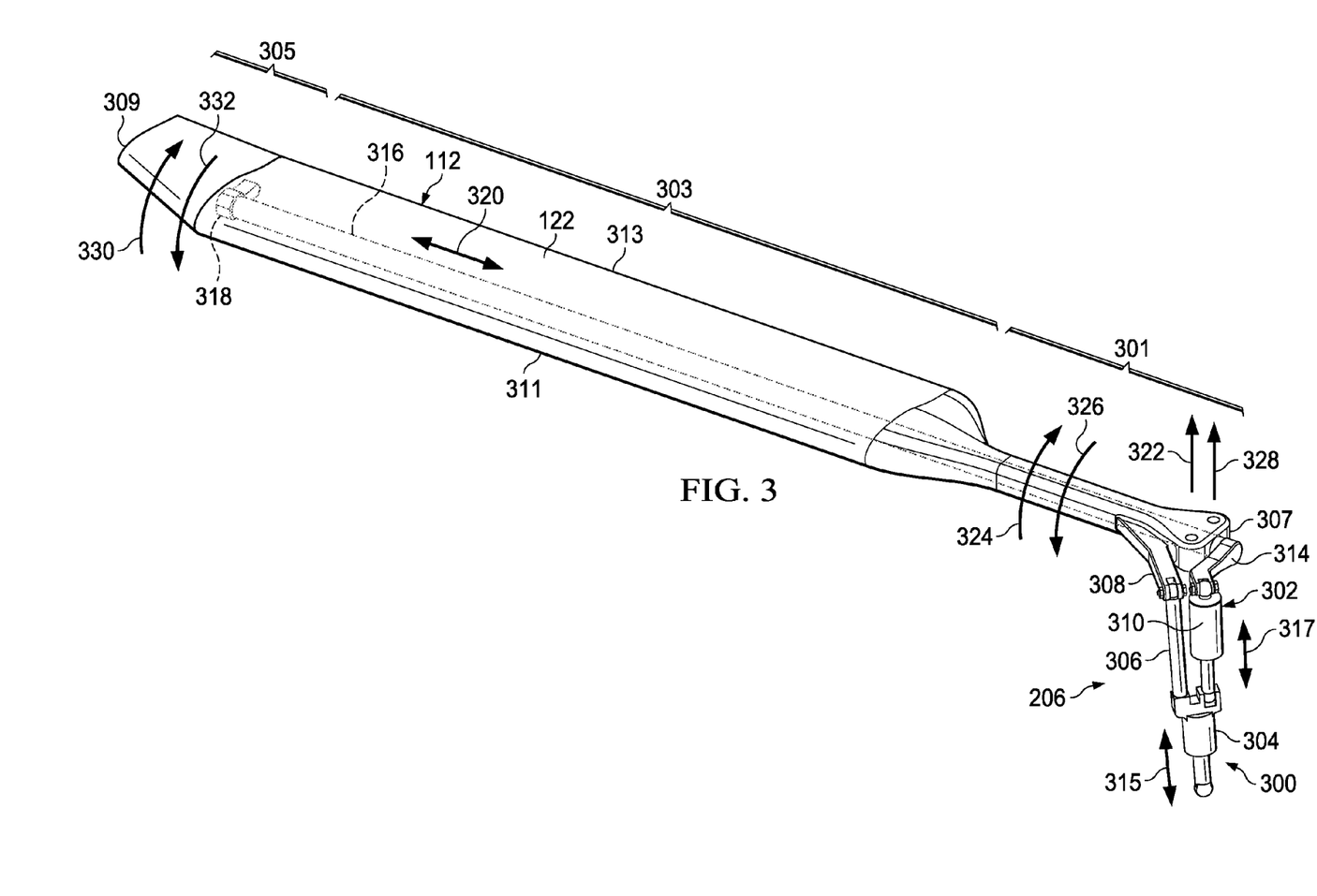
FIG. 3 is an illustration of an isometric view of an actuation system associated with a blade in accordance with an illustrative embodiment.

With reference now to FIG. 3, an illustration of an isometric view of actuation system 206 associated with blade 122 from FIG. 2 is depicted in accordance with an illustrative embodiment. As depicted, blade 122 has root portion 301, middle portion 303, and tip portion 305. Further, blade 122 has leading edge 311 and trailing edge 313.

Root portion 301 of blade 122 is the portion of blade 122 between first end 307 of blade 122 and a location on blade 122 near first end 307. Middle portion 303 of blade 122 is located between root portion 301 of blade 122 and tip portion 305 of blade 122. Tip portion 305 of blade 122 is the portion of blade 122 between second end 309 of blade 122 and a location on blade 122 near second end 309 of blade 122. In this illustrative example, first end 307 of blade 122 may be referred to as the "root" of blade 122, while second end 309 of blade 122 may be referred to as the "tip" of blade 122.

As depicted, actuation system 206 is associated with root portion 301 of blade 122. In other words, actuation system 206 is located near first end 307 of blade 122. In this illustrative example, actuation system 206 includes root actuation mechanism 300, tip actuation mechanism 302, and member 306. Root actuation mechanism 300, tip actuation mechanism 302, and member 306 are located outside of blade 122. In this manner, actuation system 206 is external to blade 122.

Root actuation mechanism 300 takes the form of linear actuator 304 in this illustrative example. Linear actuator 304 is configured to create a force in a direction along axis 315. In particular, linear actuator 304 is configured to lengthen and shorten with respect to axis 315. The lengthening or shortening of linear actuator 304 creates a force in a direction along axis 315.

Linear actuator 304 may take various forms. For example, linear actuator 304 may take the form of a hydraulic linear actuator, an electromechanical linear actuator, a pneumatic linear actuator, a piezoelectric linear actuator, or some other type of linear actuator.

In this illustrative example, linear actuator 304 is rigidly connected to member 306. As used herein, when a first component, such as linear actuator 304, is "rigidly connected" to a second component, such as member 306, these components are unable to move relative to each other. In other words, movement of one of the components may cause a similar type of movement in the other component. In other words, the connection is a fixed connection. In one illustrative example, movement of linear actuator 304 in a particular direction along axis 315 causes a substantially equal amount of movement of member 306 in the same direction along axis 315.

Member 306 takes the form of a structural link in this example. As depicted, member 306 is movably connected to part 308 of blade 122 at root portion 301 of blade 122. Part 308 is monolithic with blade 122 in this illustrative example. However, in other illustrative examples, part 308 may be a separate member that is rigidly connected to blade 122.

Tip actuation mechanism 302 takes the form of linear actuator 310. Linear actuator 310 is configured to also create a force in a direction along axis 317. In particular, linear actuator 310 is configured to lengthen and shorten with respect to axis 317. The lengthening or shortening of linear actuator 310 creates a force in a direction along axis 317.

Linear actuator 310 may take various forms. For example, similar to linear actuator 304, linear actuator 310 may take the form of a hydraulic linear actuator, an electromechanical linear actuator, a pneumatic linear actuator, a piezoelectric linear actuator, or some other type of linear actuator.

Linear actuator 310 is movably connected to linear actuator 304. Further, linear actuator 310 is movably connected to part 314 of elongate member 316 in this illustrative example. Part 314 is monolithic with elongate member 316 in this illustrative example. However, in other illustrative examples, part 314 may be a separate component that is rigidly connected to elongate member 316.

Elongate member 316 may be referred to as a torque tube in this illustrative example. Elongate member 316 is connected to tip portion 305 of blade 122. In particular, part 318 of elongate member 316 is connected to tip portion 305 of blade 122. Part 318 is monolithic with elongate member 316 in this illustrative example. However, in other illustrative examples, part 318 may be a separate component that is rigidly connected to elongate member 316. In this illustrative example, elongate member 316 may not be connected to any other portion of blade 122.

When linear actuator 304 lengthens, force 322 is generated. Force 322 may be transferred to part 308 of blade 122 at root portion 301 of blade 122. The transferring of force 322 to part 308 applies torque 324 to root portion 301, which rotates root portion 301 about pitch axis 320 through blade 122.

When linear actuator 304 shortens, a force that is opposite to force 322 is generated. The transfer of this opposite force to part 308 applies torque 326 to root portion 301, which rotates root portion 301 about pitch axis 320. As depicted, torque 326 is opposite to torque 324. In this manner, the rotation of root portion 301 about pitch axis 320 caused by torque 326 may be in a direction opposite to the rotation of root portion 301 caused by torque 324.

Additionally, when linear actuator 310 lengthens, force 328 is generated. Force 328 may be transferred to part 314 of elongate member 316. The transfer of force 328 to part 314 applies torque 330 to elongate member 316, and thereby, tip portion 305 of blade 122 connected to elongate member 316. Torque 330 causes tip portion 305 to rotate about pitch axis 320.

When linear actuator 310 shortens, a force that is opposite to force 328 is generated. The transfer of this opposite force to part 314 applies torque 332 to elongate member 316, and thereby, tip portion 305, which rotates tip portion 305 about pitch axis 320. As depicted, torque 332 is opposite to torque 330. In this manner, the rotation of tip portion 305 about pitch axis 320 caused by torque 332 may be in a direction opposite to the rotation of tip portion 305 caused by torque 330.

Further, in this illustrative example, linear actuator 310 may move when linear actuator 304 lengthens or shortens. The movement of linear actuator 310 generates a force that may be transferred to part 314 of blade 122. The transfer of this force may apply torque 324 or torque 326 to elongate member 316, and thereby, tip portion 305 of blade 122, depending on the movement of linear actuator 310.

In this manner, a first torque may be applied to root portion 301 of blade 122 by root actuation mechanism 300. A second torque may be applied to tip portion 305 of blade 122 by tip actuation mechanism 302. The second torque may be caused by the lengthening or shortening of tip actuation mechanism 302 and/or the movement of tip actuation mechanism 302 in response to the lengthening or shortening of root actuation mechanism 300.

When the first torque applied to root portion 301 of blade 122 and the second torque applied to tip portion 305 of blade 122 are substantially equal and in the same direction, the entirety of blade 122 rotates about pitch axis 320 by the same amount. In other words, when the first torque and the second torque are substantially equal and in the same direction, the entirety of blade 122 pitches by the same amount. The entirety of blade 122 includes root portion 301, middle portion 303, and tip portion 305.

However, when the first torque applied to root portion 301 of blade 122 and the second torque applied to tip portion 305 of blade 122 are not substantially equal and/or are not in the same direction, root portion 301 of blade 122 rotates about pitch axis 320 of blade 122 differently from tip portion 305 of blade 122. In other words, blade 122 twists. The degree of twisting of blade 122 depends on the magnitude and direction of the first torque and the second torque.

In this illustrative example, actuation system 206 may be used to change the amount of twisting of blade 122 during different flight regimes of rotorcraft 100. This type of twisting of blade 122 may be referred to as dynamic twisting.

Further, actuation system 206 may be used to pitch blade 122 at a pitch frequency within a selected range. In some cases, blade 122 may be pitched at a pitch frequency greater than about once per revolution. Of course, in other illustrative examples, blade 122 may be configured to be pitched at some other pitch frequency.

Actuation system 206 may be operated such that blade 122 cycles through this selected range more than once per revolution. For example, during flight of rotorcraft 100, actuation system 206 may be operated such that the pitch frequency for blade 122 is twice per revolution about mast 120, three times per revolution about mast 120, five times per revolution about mast 120, ten times per revolution about mast 120, or some other pitch frequency above once per revolution about mast 120.

In this illustrative example, actuation systems 206, 208, 210, and 212 in FIG. 2 may be used to pitch and/or twist blades 122, 124, 126, and 128, respectively, together or independently of each other. For example, blade 122 and 126 may be pitched at higher frequencies than blade 124 and blade 128 during forward flight. As another example, the amount of twisting of blade 122 and blade 126 may be changed during forward flight while the amount of twisting of blade 124 and blade 128 is left unchanged.

The illustrations of rotorcraft 100 in FIG. 1, main rotor system 108 in FIG. 2, and actuation system 206 in FIG. 3 are not meant to imply physical or architectural limitations to the manner in which an illustrative embodiment may be implemented. Other components in addition to or in place of the ones illustrated may be used. Some components may be optional. Another configuration for an actuation system is depicted in FIGS. 4-5.

Figure 4:
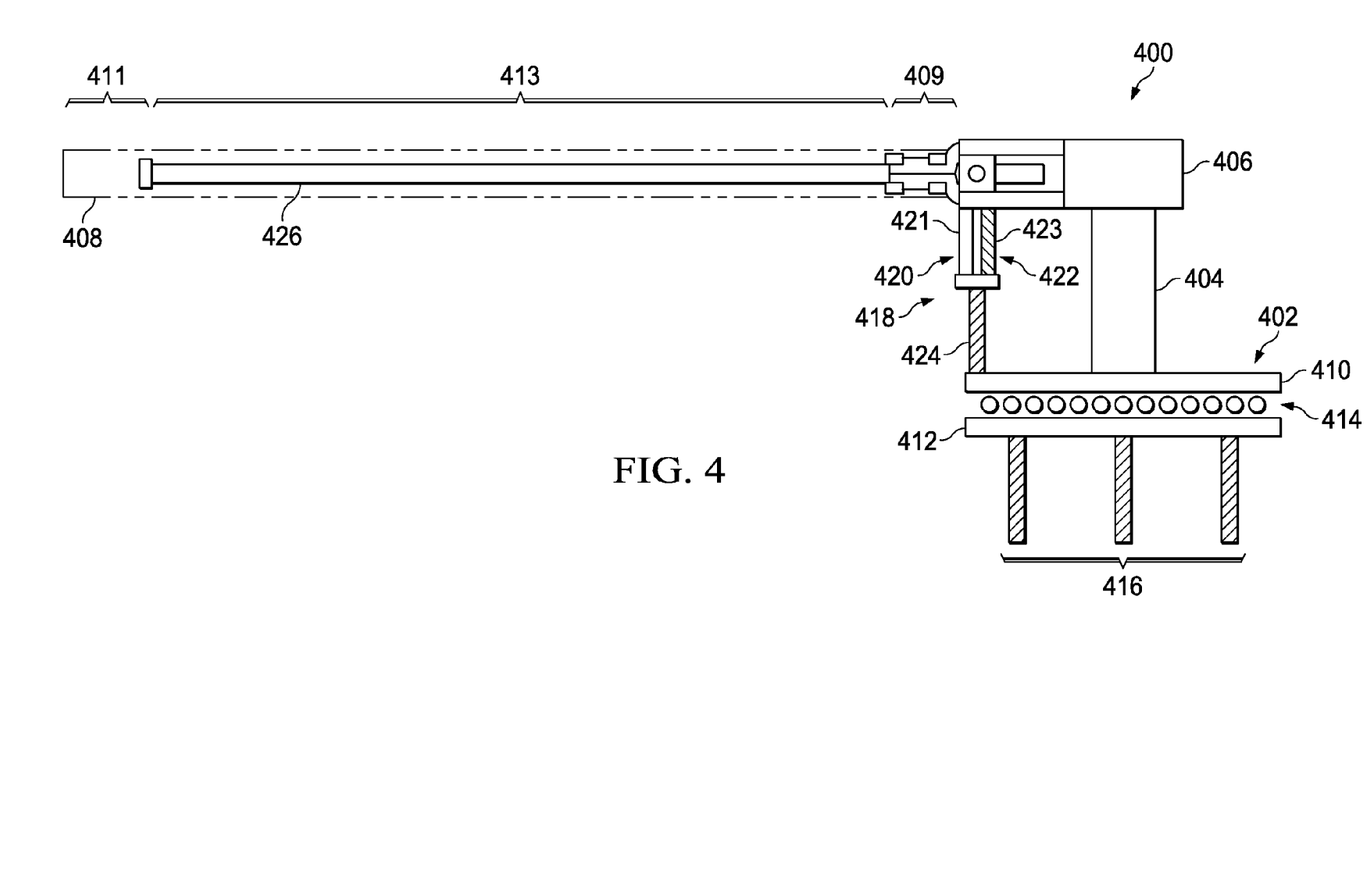
FIG. 4 is an illustration of a side view of a portion of a rotor system in accordance with an illustrative embodiment.
Figure 5:
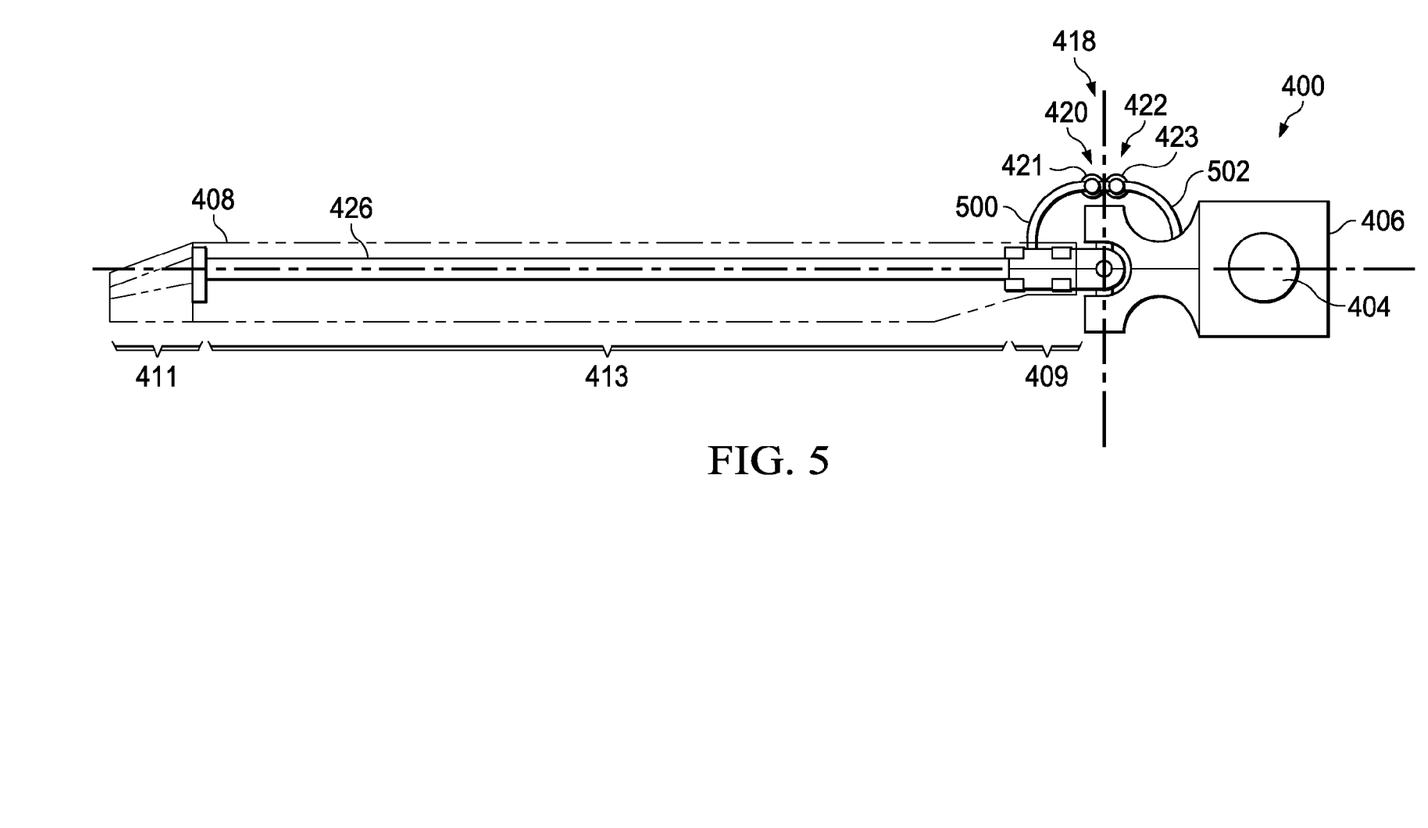
FIG. 5 is an illustration of a top view of a portion of a rotor system in accordance with an illustrative embodiment.

With reference now to FIG. 4, an illustration of a side view of a portion of a rotor system is depicted in accordance with an illustrative embodiment. In this illustrative example, rotor system 400 includes swashplate assembly 402, mast 404, hub 406, and blade 408. Blade 408 is connected to hub 406 and configured to revolve around mast 404. Blade 408 may be described as having root portion 409, tip portion 411, and middle portion 413 located between root portion 409 and tip portion 411.

As depicted, swashplate assembly 402 includes first swashplate 410 and second swashplate 412. First swashplate 410 is associated with second swashplate 412 through ball bearings 414. Ball bearings 414 allow first swashplate 410 to rotate relative to second swashplate 412.

In this illustrative example, set of linear actuators 416 are associated with second swashplate 412. Set of linear actuators 416 may be used to move swashplate assembly 402 vertically and/or tilt swashplate assembly 402.

Actuation system 418 is associated with both swashplate assembly 402 and blade 408. Actuation system 418 is external to blade 408. Actuation system 418 may have a configuration different from actuation system 206 in FIGS. 2-3.

As depicted, actuation system 418 includes root actuation mechanism 420, tip actuation mechanism 422, and member 424. In this illustrative example, root actuation mechanism 420 takes the form of linear actuator 421 and tip actuation mechanism 422 takes the form of linear actuator 423.

Linear actuator 421 and linear actuator 423 are both movably connected to member 424. Member 424 is rigidly connected to first swashplate 410.

Linear actuator 421 is associated with root portion 409 of blade 408. Linear actuator 421 is configured to generate a first force that may be used to apply a first torque to the entirety of blade 408. Linear actuator 423 is associated with elongate member 426 within blade 408. Elongate member 426 is connected to tip portion 411 of blade 408. Linear actuator 423 is configured to generate a second force that may be used to apply a second torque to elongate member 426, and thereby, tip portion 411 of blade 408.

Root actuation mechanism 420 and tip actuation mechanism 422 may not be coupled in this illustrative example. In other words, the lengthening or shortening of one of linear actuator 421 and linear actuator 423 may not cause movement of the other linear actuator.

Blade 408 may be pitched by lengthening linear actuator 421 and linear actuator 423 by the same amount or shortening linear actuator 421 and linear actuator 423 by the same amount. In other words, blade 408 may be pitched by operating linear actuator 421 and linear actuator 423 in the same manner.

Blade 408 may be twisted by operating these linear actuators differently. For example, blade 408 may be twisted by lengthening one of linear actuator 421 and linear actuator 423 and shortening or not operating the other linear actuator.

As another example, blade 408 may be twisted by shortening one of linear actuator 421 and linear actuator 423 and lengthening or not operating the other linear actuator. As yet another example, blade 408 may be twisted by lengthening linear actuator 421 and linear actuator 423 by different amounts or shortening linear actuator 421 and linear actuator 423 by different amounts.

Turning now to FIG. 5, an illustration of a top view of rotor system 400 from FIG. 4 is depicted in accordance with an illustrative embodiment. As depicted, linear actuator 421 may be connected to blade 408 by member 500. Linear actuator 423 may be connected to elongate member 426 by member 502.

Figure 6:
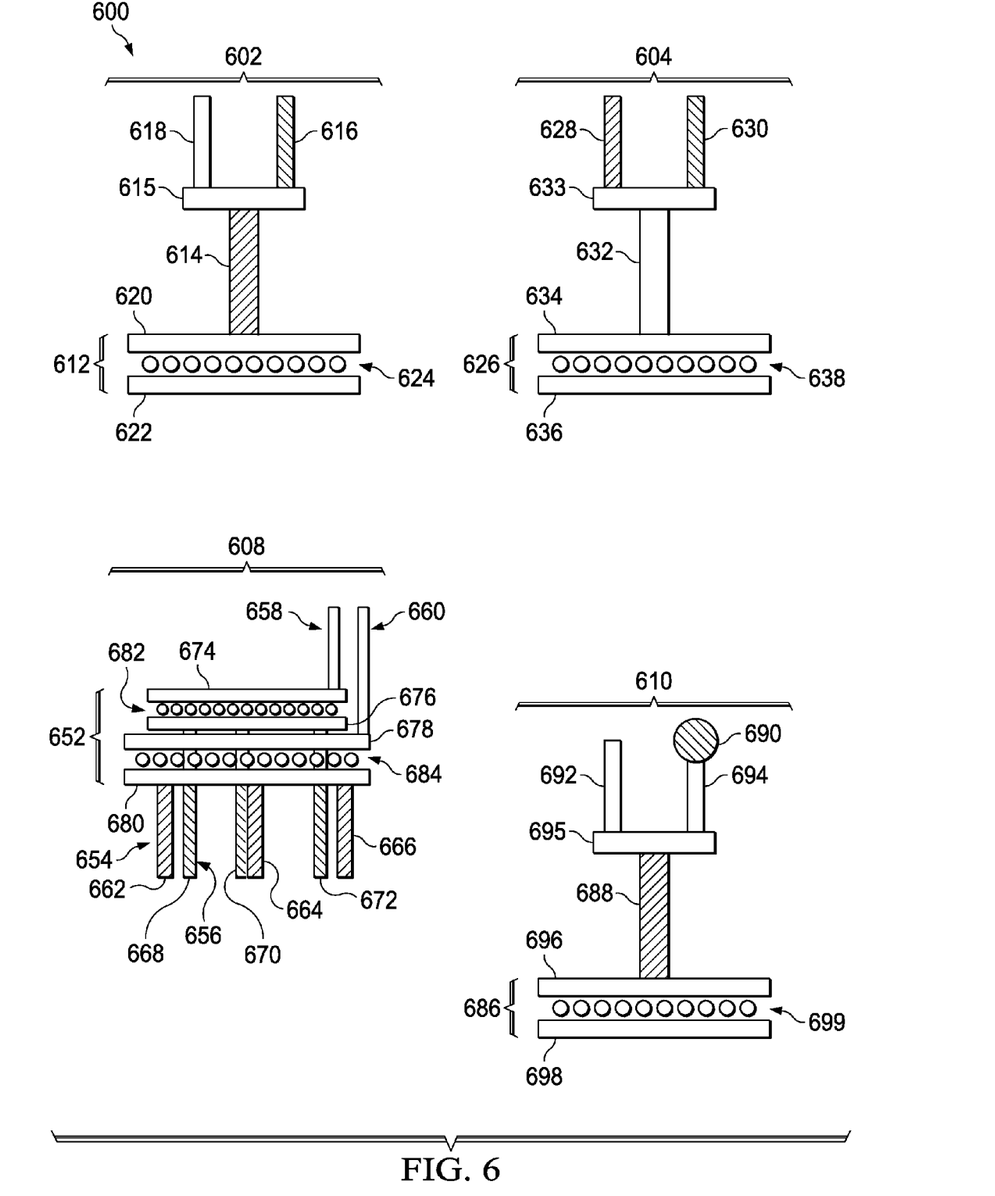
FIG. 6 is an illustration of various potential configurations for an actuation system in accordance with an illustrative embodiment.

With reference now to FIG. 6, an illustration of various potential configurations for an actuation system is depicted in accordance with an illustrative embodiment. Configurations 600 represent potential configurations for an actuation system for a blade. In particular, configurations 600 may be schematic representations of actuation systems.

As depicted, configurations 600 include configuration 602, configuration 604, configuration 608, and configuration 610. Each of these configurations for an actuation system includes a first actuation mechanism and a second actuation mechanism.

The first actuation mechanism may be associated with a root portion of a blade, while the second actuation mechanism may be associated with a tip portion of a blade through an elongate member. In this manner, the first actuation mechanism and the second actuation mechanism may be referred to as a root actuation mechanism and a tip actuation mechanism, respectively. The root actuation mechanism and the tip actuation mechanism may each be implemented using one or more actuators. For example, each of these actuation mechanisms may be implemented using a linear actuator or a rotary actuator.

Further, the members described in the configurations below may be rigid members of fixed length and size. Each of these members may be selected from one of, for example, without limitation, a structural link, a rod, a beam, a tube, or some other type of structural member.

Configuration 602 represents the same configuration used for actuation system 206 in FIGS. 2-3. The actuation system represented by configuration 602 includes swashplate assembly 612, first linear actuator 614, second linear actuator 616, member 615, and member 618. As depicted, swashplate assembly 612 includes first swashplate 620 and second swashplate 622. First swashplate 620 is associated with second swashplate 622 through ball bearings 624. Ball bearings 624 allow first swashplate 620 to rotate relative to second swashplate 622.

First linear actuator 614 is directly connected to first swashplate 620. Member 615 is connected to first linear actuator 614. Second linear actuator 616 and member 618 are connected to member 625.

Member 618 may be associated with the root portion of a blade. Operation of first linear actuator 614 causes movement of member 618, which in turn, causes the root portion of the blade to be rotated about a pitch axis through the blade.

Further, second linear actuator 616 may be associated with an elongate member that is connected to a tip portion of the same blade. Operation of first linear actuator 614 causes movement of second linear actuator 616, which in turn, causes the tip portion of the blade to rotate about the pitch axis. Additionally, operation of second linear actuator 616 also causes the tip portion of the blade to rotate about the pitch axis.

With configuration 602, pitching of the blade may require operation of both first linear actuator 614 and second linear actuator 616. However, twisting of the blade may only require that at least one of first linear actuator 614 and second linear actuator 616 be operated.

Turning now to configuration 604, the actuation system represented includes swashplate assembly 626, first linear actuator 628, second linear actuator 630, member 632, and member 633. Configuration 604 represents the same configuration for actuation system 418 in FIGS. 4-5. As depicted, swashplate assembly 626 includes first swashplate 634 and second swashplate 636, which are associated with each other through ball bearings 638.

First linear actuator 628 and second linear actuator 630 are connected to first swashplate 634 through member 632 and member 633. First linear actuator 628 may be associated with the root portion of a blade and used to rotate this root portion about a pitch axis through the blade. Second linear actuator 630 may be associated with an elongate member that is connected to a tip portion of the same blade and used to rotate this tip portion about the pitch axis.

Pitching of this blade may require operation of both first linear actuator 628 and second linear actuator 630. However, twisting of the blade may only require operation of at least one of first linear actuator 628 and second linear actuator 630.

The actuation system represented by configuration 608 includes dual swashplate assembly 652, root actuation mechanism 654, tip actuation mechanism 656, member 658, and member 660. Root actuation mechanism 654 includes linear actuators 662, 664, and 666. Tip actuation mechanism 656 includes linear actuators 668, 670, and 672.

As depicted, dual swashplate assembly 652 includes swashplates 674, 676, 678, and 680. Swashplate 674 and swashplate 676 are associated through ball bearings 682. Swashplate 678 and swashplate 680 are associated through ball bearings 684. Linear actuators 662, 664, and 666 of root actuation mechanism 654 are connected to swashplate 680. Linear actuators 668, 670, and 672 of tip actuation mechanism 656 are connected to swashplate 676. Further, member 658 is connected to swashplate 674, while member 660 is connected to swashplate 678.

Linear actuators 662, 664, and 666 may be used to move swashplate 680, and thereby swashplate 678, which in turn, moves member 660. Member 660 may be associated with the root portion of a blade. Movement of member 660 may cause the root portion to be rotated about a pitch axis through the blade.

Linear actuators 668, 670, and 672 may be used to move swashplate 676, and thereby swashplate 674, which in turn, moves member 658. Member 658 may be associated with an elongate member that is connected to the tip portion of the blade. Movement of member 658 may cause the tip portion to be rotated about the pitch axis.

With configuration 608, pitching of the blade may require operation of both root actuation mechanism 654 and tip actuation mechanism 656. However, twisting of the blade may only require that at least one of root actuation mechanism 654 and tip actuation mechanism 656 be operated.

The actuation system represented by configuration 610 includes swashplate assembly 686, linear actuator 688, rotary actuator 690, member 692, member 694, and member 695. Swashplate assembly 686 includes first swashplate 696 and second swashplate 698 that are associated with each other by ball bearings 699.

Linear actuator 688 is connected to first swashplate 696. Member 695 is connected to linear actuator 688. Member 692 and member 694 are connected to member 695. Member 692 may be associated with a root portion of a blade. Rotary actuator 690 is connected to member 694. Rotary actuator 690 may be associated with an elongate member that is connected to a tip portion of the blade.

Operation of linear actuator 688 causes movement of member 692 and member 694. Movement of member 692 may cause rotation of the root portion of the blade about a pitch axis through the blade. Movement of member 694 may cause rotation of the tip portion of the blade about the pitch axis. Further, operation of rotary actuator 690 may also cause rotation of the tip portion of the blade about the pitch axis.

The illustration of configurations 600 for an actuation system in FIG. 6 is not meant to imply physical or architectural limitations to the manner in which an illustrative embodiment may be implemented. Other components in addition to or in place of the ones illustrated may be used. Some components may be optional.

For example, in some cases, a configuration for the actuation system may include a rotary actuator associated with the root portion of the blade in addition to a rotary actuator associated with the elongate member connected to the tip portion of the blade. In this configuration, no linear actuators may be needed.

In still other illustrative examples, the actuation system may only include one actuation mechanism. For example, the single actuation mechanism may be used to twist the blade.

Figure 7:
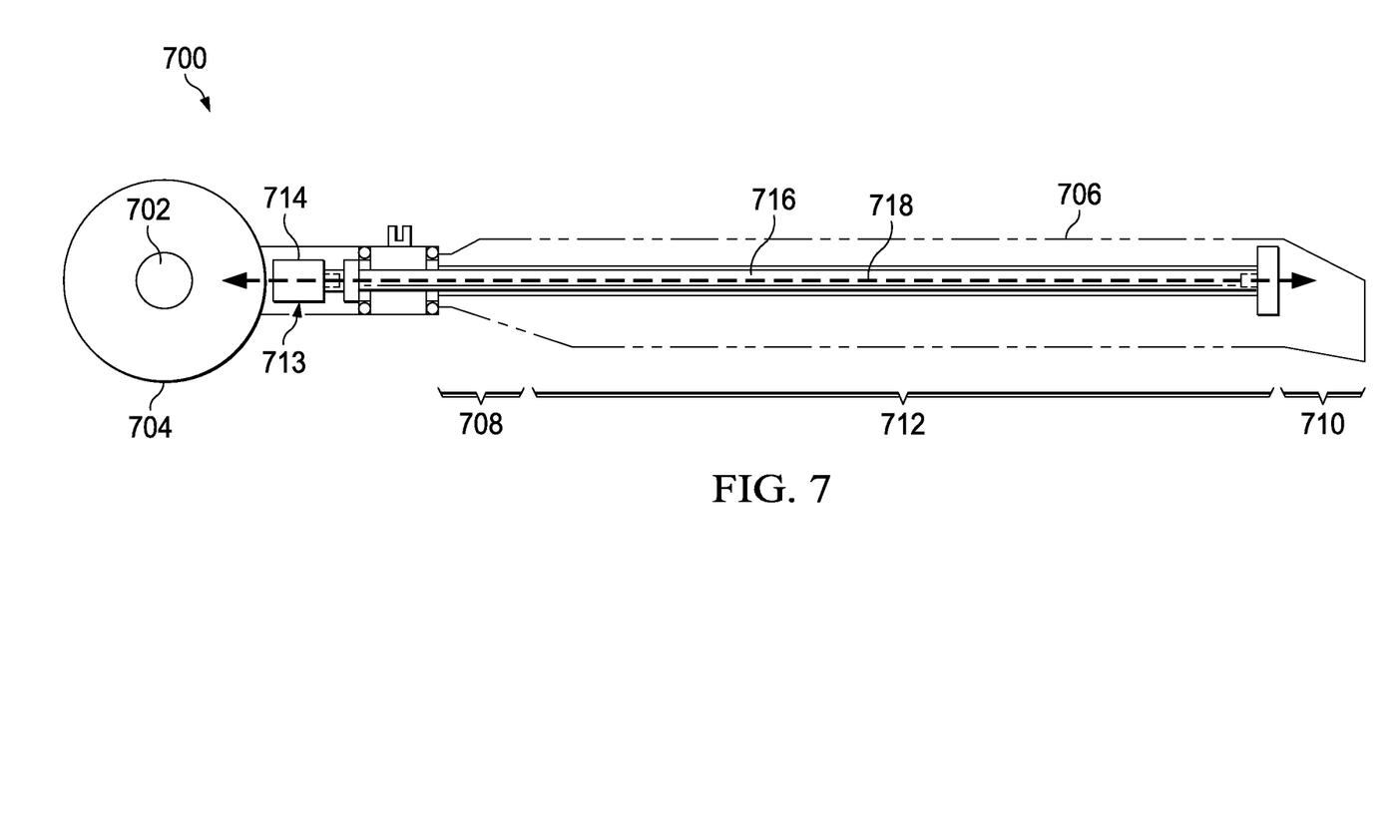
FIG. 7 is an illustration of a portion of a rotor system in accordance with an illustrative embodiment.

With reference now to FIG. 7, an illustration of a portion of a rotor system is depicted in accordance with an illustrative embodiment. In this illustrative example, rotor system 700 includes mast 702, hub 704, and blade 706. Blade 706 is connected to hub 704 and configured to revolve around mast 702. Blade 706 may be described as having root portion 708, tip portion 710, and middle portion 712 located between root portion 708 and tip portion 710.

Actuation system 713 is associated with root portion 708 of blade 706 but is external to blade 706. Actuation system 713 comprises rotary actuator 714. Rotary actuator 714 may be an example of one manner in which rotary actuator 690 in FIG. 6 may be implemented. However, no other actuators or actuation mechanism may be present in actuation system 713. In other words, actuation system 713 may not include a linear actuator such as, for example, linear actuator 688 in FIG. 6.

In this illustrative example, rotary actuator 714 is associated with elongate member 716 running through blade 706. Elongate member 716 may be referred to as a torque tube. Elongate member 716 may be connected to tip portion 710 of blade 706 but no other portion of blade 706.

As depicted, rotary actuator 714 is located near root portion 708 of blade 706 but is external to blade 706. Rotary actuator 714 may be used to rotate elongate member 716. Rotating elongate member 716 causes tip portion 710 of blade 706 connected to elongate member 716 to rotate about pitch axis 718 through blade 706. In particular, tip portion 710 of blade 706 may be rotated about pitch axis 718 relative to root portion 708 of blade 706. In this manner, blade 706 may be twisted.

The illustration of rotor system 700 in FIG. 7 is not meant to imply physical or architectural limitations to the manner in which an illustrative embodiment may be implemented. Other components in addition to or in place of the ones illustrated may be used. Some components may be optional.

Figure 8:
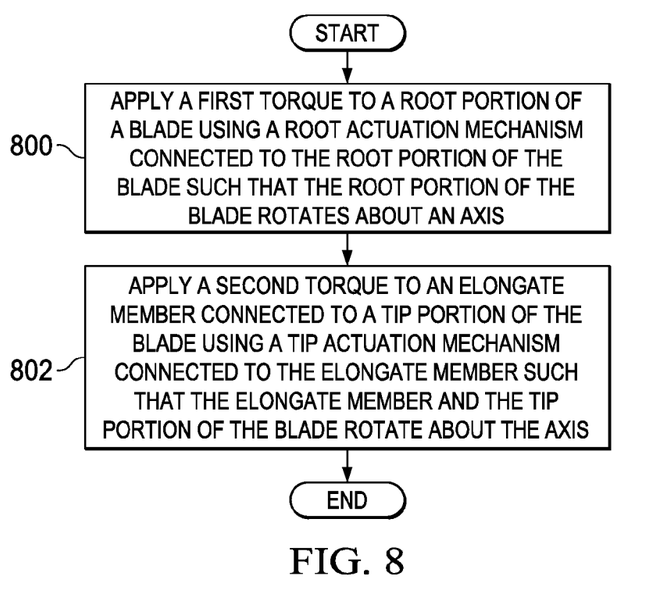
FIG. 8 is an illustration of a process for moving a blade of a rotorcraft in the form of a flowchart in accordance with an illustrative embodiment.

With reference now to FIG. 8, an illustration of a process for moving a blade rotorcraft in the form of a flowchart is depicted in accordance with an illustrative embodiment. The process illustrated in FIG. 8 may be implemented using, for example, without limitation, pitch and twist system 116 from FIG. 1.

The process begins by applying a first torque to a root portion of a blade using a root actuation mechanism associated with the root portion of the blade such that the root portion of the blade rotates about an axis through the blade (operation 800). This axis may be, for example, a pitch axis through the blade.

Thereafter, a second torque is applied to an elongate member connected to a tip portion of the blade using a tip actuation mechanism associated with the elongate member such that the elongate member and the tip portion of the blade rotate about the axis (operation 802), with the process terminating thereafter. The elongate member may also be referred to as a torque tube. Further, the root actuation mechanism and the tip actuation mechanism may each take the form of a linear actuator, a rotary actuator, and/or one or more actuators of any number of types.

The root actuation mechanism and the tip actuation mechanism are part of an actuation system for the blade. Depending on the configuration for the actuation system, operation 800 and operation 802 may be performed simultaneously to pitch the blade. In some cases, only operation 800 may be needed to be performed to pitch the blade. Further, at least one of operation 800 and operation 802 may be performed to twist the blade.

Figure 9:
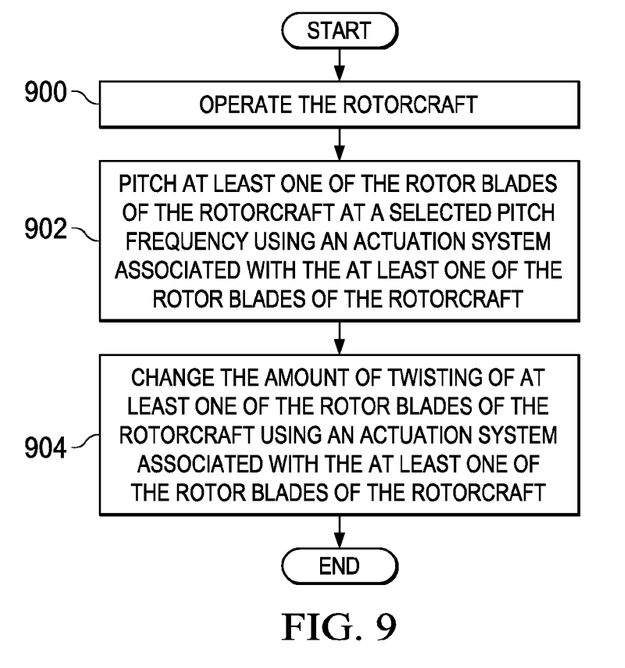
FIG. 9 is an illustration of a process for improving the performance of a rotorcraft during flight in the form of a flowchart in accordance with an illustrative embodiment.

With reference now to FIG. 9, an illustration of a process for improving the performance of a rotorcraft during flight in the form of a flowchart is depicted in accordance with an illustrative embodiment. The process illustrated in FIG. 9 may be performed to improve the performance of a rotorcraft such as, for example, rotorcraft 100 in FIG. 1.

The process begins by operating the rotorcraft (operation 900). The rotorcraft may have a pitch and twist system, such as, for example, pitch and twist system 116 in FIG. 1. The pitch and twist system may include an actuation system associated with each of the rotor blades of the rotorcraft. Each of these actuation systems may be implemented using any one of configurations 600 in FIG. 6. Depending on the implementation, the same and/or different configurations may be used for the different actuation systems associated with the different rotor blades.

During operation of the rotorcraft, at least one of the rotor blades of the rotorcraft is pitched at a selected pitch frequency using an actuation system associated with the at least one of the rotor blades of the rotorcraft (operation 902). The selected pitch frequency may be, for example, a number of pitching cycles per revolution greater than, but not limited to, once per revolution. Pitching the rotor blades at a high pitch frequency may provide improved lift performance of the rotorcraft.

Further, during operation of the rotorcraft, the amount of twisting of at least one of the rotor blades of the rotorcraft is changed using an actuation system associated with the at least one of the rotor blades of the rotorcraft (operation 904), with the process terminating thereafter. The amount of twisting of the at least one of rotor blades may be changed any number of times while the rotorcraft is any one or combination of the flight regimes of the rotorcraft.

In some cases, the twisting of a blade may be changed within a single revolution of the blade. The twisting of the rotor blades of the rotorcraft may be used to reduce the vibrations generated by the rotor blades and/or noise. In this manner, the aerodynamic performance of the rotorcraft may be improved.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide an actuation system that may be associated with a blade for a rotorcraft and used to pitch and/or twist the blade. In one illustrative embodiment, an actuation system comprises a root actuation mechanism and a tip actuation mechanism.

The root actuation mechanism is associated with a root portion of a blade and is configured to transfer a first force to the root portion of the blade. The transferring of this first force to the root portion of the blade applies a first torque to the root portion of the blade that moves the root portion of the blade. In particular, application of the first torque to the root portion of the blade causes the root portion of the blade to rotate about a pitch axis through the blade.

The tip actuation mechanism is associated with an elongate member at the root portion of the blade. The elongate member is associated with a tip portion of the blade. The portion of the elongate member at the root portion of the blade may be considered "free-floating" with respect to the root portion of the blade.

The tip actuation mechanism is configured to transfer a second force to the elongate member. Transferring this first force to the elongate member applies a second torque to the elongate member and the tip portion of the blade associated with the elongate member that causes the tip portion of the blade to move about the pitch axis through the blade. In particular, application of the second torque to the tip portion of the blade causes the tip portion of the blade to rotate about the pitch axis.

The illustrative embodiments recognize and take into account that this type of actuation system does not require the use of any actuators integrated into the blade. In this manner, the actuation system provided by the illustrative embodiments may not increase the weight of the blade more than desired. Further, power may not need to be delivered to the blade itself. In other words, additional power lines and/or other components may not need to be added to the blade to deliver power to the blade.

Additionally, by using an actuation system that is associated with the root portion of the blade, the overall contour of the blade may not be affected. Thus, performance of the blade may not be reduced beyond selected tolerances with this type of root-mounted actuation system.

Further, the configuration for the actuation system described above allows actuation mechanisms having shorter response times than thermo-electric based actuators or piezoelectric actuators to be used. In this manner, twisting of the blade may be achieved more quickly and efficiently using the actuation system described by the illustrative embodiments as compared to some currently available actuation systems.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a blade of a rotorcraft; and
   a tip actuation mechanism that is external to the blade and associated with an elongate member that is connected to a tip portion of the blade, wherein the tip actuation mechanism is configured to apply a torque to the elongate member such that the tip portion of the blade twists relative to a root portion of the blade about an axis through the blade defined by the elongate member.

2. The apparatus of claim 1 further comprising:
   a root actuation mechanism external to the blade and associated with the root portion of the blade, wherein the root actuation mechanism is configured to apply a torque to the root portion of the blade such that the root portion of the blade rotates about the axis.

3. The apparatus of claim 2, wherein the tip actuation mechanism and the root actuation mechanism are part of an actuation system configured to at least one of pitch and twist the blade.

4. The apparatus of claim 3, wherein the actuation system is configured to pitch the blade at a selected pitch frequency greater than once per revolution during operation of the rotorcraft.

5. The apparatus of claim 3, wherein the actuation system is configured to change an amount of twisting of the blade while the rotorcraft is in a flight regime during operation of the rotorcraft.

6. The apparatus of claim 2, wherein the torque applied to the root portion of the blade is a first torque applied by transferring a first force generated by the root actuation mechanism to the root portion of the blade and wherein the torque applied to the elongate member is a second torque applied by transferring a second force generated by the tip actuation mechanism to the tip portion of the blade through the elongate member.

7. The apparatus of claim 6, wherein the blade pitches when the first torque and the second torque are substantially equal and in a same direction.

8. The apparatus of claim 6, wherein the blade twists when the first torque and the second torque are at least one of not substantially equal and not in a same direction.

9. The apparatus of claim 6, wherein the root actuation mechanism comprises:
   an actuator configured to generate the first force, wherein the actuator is selected from one of a linear actuator and a rotary actuator.

10. The apparatus of claim 6, wherein the tip actuation mechanism comprises:
    an actuator configured to generate the second force, wherein the actuator is selected from one of a linear actuator and a rotary actuator.

11. The apparatus of claim 2, wherein the root actuation mechanism and the tip actuation mechanism are associated with a swashplate assembly.

12. The apparatus of claim 1, wherein the elongate member is a torque tube.

13. A rotor system comprising:
    A plurality of blades; and
    A pitch and twist system comprising a plurality of actuation systems in which each of the plurality of actuation systems is associated with a corresponding one of the plurality of blades and comprises:
       A root actuation mechanism that is external to a blade and associated with a root portion of the blade, wherein the root actuation mechanism is configured to apply a first torque to the root portion of the blade such that the root portion of the blade rotates about an axis through the blade; and
       A tip actuation mechanism that is external to the blade and associated with an elongate member that is connected to a tip portion of the blade, wherein the tip actuation mechanism is configured to apply a second torque to the elongate member such that the tip portion of the blade twists about an axis through the blade defined by the elongate member, the tip portion twisting relative to the root portion of the blade.

14. The rotor system of claim 13, wherein the blade pitches when the first torque and the second torque are substantially equal and in a same direction.

15. The rotor system of claim 13, wherein the blade twists when the first torque and the second torque are at least one of not substantially equal and not in a same direction.

16. A method for moving a blade of a rotorcraft, the method comprising:

Operating the rotorcraft; and

Applying a torque to the elongate member connected to a tip portion of the blade during operation of the rotorcraft using a tip actuation mechanism that is external to the blade and associated with the elongate member such that the tip portion of the blade twists about an axis through the blade defined by the elongate member, the tip portion twisting relative to a root portion of the blade.

17. The method of claim 16 further comprising:

applying a torque to the root portion of the blade using a root actuation mechanism external to the blade and associated with the root portion of the blade such that root portion of the blade rotates about the axis, wherein the torque applied to the root portion is a first torque and wherein the torque applied to the elongate member is a second torque.

18. The method of claim 17 further comprising:

performing at least one of applying the first torque to the root portion of the blade and applying the second torque to the elongate member to pitch the blade at a selected pitch frequency greater than once per revolution during operation of the rotorcraft.

19. The method of claim 17 further comprising:

performing at least one of applying the first torque to the root portion of the blade and applying the second torque to the elongate member to change an amount of twisting of the blade while the rotorcraft is in a flight regime during operation of the rotorcraft.

20. The method of claim 19, wherein the step of performing the at least one of applying the first torque to the root portion of the blade and applying the second torque to the elongate member comprises:

performing the at least one of applying the first torque to the root portion of the blade and applying the second torque to the elongate member to change the amount of twisting of the blade while the rotorcraft is in the flight regime during operation of the rotorcraft such that at least one of vibrations generated by the blade and noise is reduced and such that aerodynamic performance is improved.

* * * * *

UNITED STATES PATENT AND TRADEMARK OFFICE
CERTIFICATE OF CORRECTION

Page 1 of 1

PATENT NO. : 9,487,291 B2
APPLICATION NO. : 13/705780
DATED : November 8, 2016
INVENTOR(S) : Zientek et al.

It is certified that error appears in the above-identified patent and that said Letters Patent is hereby corrected as shown below:

In the Specification

Column 1, Line 1, please insert the following paragraph just after the title as follows:
-- This invention was made with Government support under Contract No. HR0011-10-9-0001 awarded by Defense Advanced Research Project Agency. The Government has certain rights in the invention. --.

In the Claims

Column 15, Line 6 and Line 8, remove spacing,

Column 15, Line 8, correct "the elongate member" to read -- an elongate member --, Column 15, Line 17, remove spacing.

Signed and Sealed this
Fourth Day of June, 2019

Andrei Iancu
*Director of the United States Patent and Trademark Office*

UNITED STATES PATENT AND TRADEMARK OFFICE
CERTIFICATE OF CORRECTION

PATENT NO.      : 9,487,291 B2
APPLICATION NO. : 13/705780
DATED           : November 8, 2016
INVENTOR(S)     : Zientek et al.

It is certified that error appears in the above-identified patent and that said Letters Patent is hereby corrected as shown below:

In the Claims

Column 15, Line 20, correct "that root portion" to read -- that the root portion --.

Signed and Sealed this
Thirteenth Day of August, 2019

Andrei Iancu
*Director of the United States Patent and Trademark Office*